United States Patent
Maher

[11] 3,740,006
[45] June 19, 1973

[54] AIRCRAFT CABIN OUTFLOW VALVE WITH TORQUE REDUCTION AND NOISE ABATEMENT MEANS

[75] Inventor: John F. Maher, Enfield, Conn.
[73] Assignee: United Aircraft Corporation, East Hartford, Conn.
[22] Filed: July 29, 1971
[21] Appl. No.: 167,115

[52] U.S. Cl. .............................. 244/129 D, 244/1 N
[51] Int. Cl. ............................................... B64c 1/14
[58] Field of Search............ 244/117, 129 D, 75 R, 244/42 DA, 42 DC; 98/1.5; 251/112

[56] References Cited
UNITED STATES PATENTS

| | | | |
|---|---|---|---|
| 3,426,984 | 2/1969 | Emmons | 244/129 D X |
| 3,387,804 | 6/1968 | Rhines | 244/129 D |
| 3,544,045 | 12/1970 | Butscher | 251/212 X |
| 2,118,705 | 5/1938 | Hall | 244/42 DC |
| 2,191,842 | 2/1946 | Back | 244/75 R |

*Primary Examiner*—Milton Buchler
*Assistant Examiner*—Gregory W. O'Connor
*Attorney*—Norman Friedland

[57] ABSTRACT

Noise abatement and actuation torque reducing means are added to a cabin outflow valve of the type having an inboard and outboard gate each being pivotally mounted adjacent the skin of the aircraft so that the inboard gate moves into the cabin and the outborad gate moves into the slipstream and the outer ends are formed so as to define a thrust recovery nozzle in the partially open position. The noise abatement and torque reduction means includes a duct-like member mounted on the under surface of the inboard gate adjacent the outboard gate having its leading edge in axial alignment with the discharge flow through the gate valve and discharging therefrom in substantially an axial direction when in the thrust recovery position.

5 Claims, 2 Drawing Figures

PATENTED JUN 19 1973

3,740,006

INVENTOR
JOHN F. MAHER

BY Norman Friedland
ATTORNEY 3,740,006

AIRCRAFT CABIN OUTFLOW VALVE WITH TORQUE REDUCTION AND NOISE ABATEMENT MEANS

BACKGROUND OF THE INVENTION

This invention relates to outflow valves of a cabin pressurization system and particularly to means for suppressing the noise propagated by the flow passing therethrough and reducing torque necessary to actuate the valve.

This invention constitutes an improvement over the mechanism shown in U.S. Pat. No. 3,387,804 granted to T. B. Rhines entitled "Valve Construction" on June 11, 1968 and U.S. Pat. No. 3,426,984 granted to F. R. Emmons on Feb. 11, 1969 entitled "Aircraft Pressurization Outflow Valve," both of which are assigned to the same assignee. Both of these patents describe outflow valves for a cabin pressurization system having a pair of hinged plate-like elements mounted adjacent the skin of the aircraft wherein one of the valve elements (inboard gate) is retractable within the aircraft and the other (outboard gate) is movable to extend into the slipstream of the aircraft providing an opening for discharging the air from the cabin to ambient. The adjacent ends of both members are so formed to provide thrust recovery when in the slightly open position. Although these types of valves have proven to be satisfactory, an attendant problem is that they propagate noise when in the opened position by virtue of the air passing between the two gate members. The problem solved by the present invention is the reduction of the noise level with an attendant torque reduction which is achieved by mounting a duct-like element on the face of the inboard gate so as to conduct the discharge air in a controllable fashion. While it would be obvious to dispose the valve within a housing lined with noise absorbent materials and/or line the valve elements with such material, such designs are undesirable inasmuch as they add to the weight of the valve and incur an overall weight penalty to the aircraft together with a loss in thrust recovery. Although noise suppression may be obtained by extending the outboard gate to define with the inboard gate an open ended extended channel, this would require a significant increase in power from the actuating mechanism. Obviously, this would be intolerable since it also would increase weight and size of the actuator. The incorporation of the duct-like element mounted on the inboard gate not only serves to reduce the noise and tone levels but the reaction forces caused by the effect of the high velocity air passing over the duct surfaces is negated with a consequential reduction of the torque required to position the gate. Thus, although a slight increase in weight is evidenced, this increase in weight is more than offset by the inherent torque reduction eliminating the necessity of providing additional power.

SUMMARY OF THE INVENTION

One object of this invention is to provide an improved cabin pressure outflow valve.

Another object of this invention is to provide an improved aircraft cabin outflow valve having means for suppressing the noise propagated by the airflow therethrough.

A still further object of this invention is to provide an improved aircraft cabin outflow valve having means to reduce actuating torque.

A still further object of this invention is to provide in a valve having an inboard and outboard hinged gates as described, a duct-like element mounted on the inboard gate and having its leading edge disposed adjacent to the opening for the airflow passing between the gates.

A still further object of this invention is to provide a cabin outflow valve having a duct-like member mounted on the inboard gate and having its receiving end in alignment with the airflow discharging through the gate in the normal or thrust recovery position and the inlet cross-sectional area being smaller than the outlet cross-sectional area.

Other features and advantages will be apparent from the specification and claims and from the accompanying drawings which illustrate an embodiment of the invention.

DESCRIPTION OF THE PREFERRED EMBODIMENT

Figure 1:
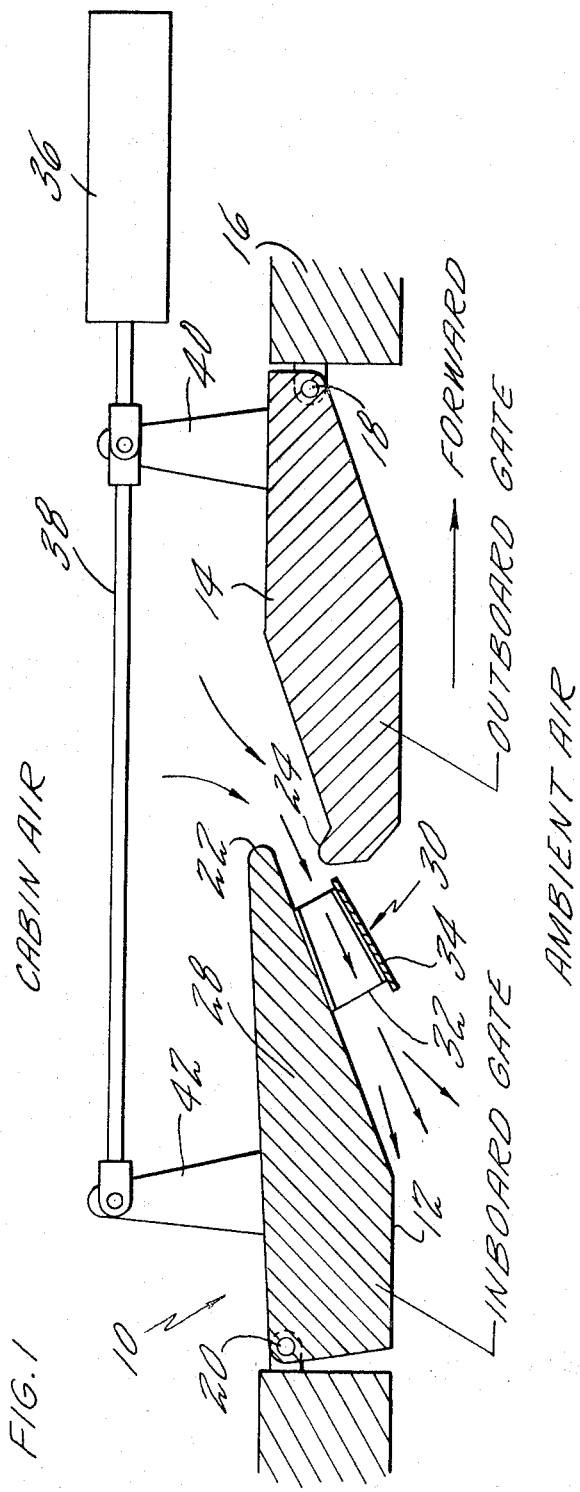
FIG. 1 is a view, partly in schematic and partly in section, showing the details of the present invention.
Figure 2:
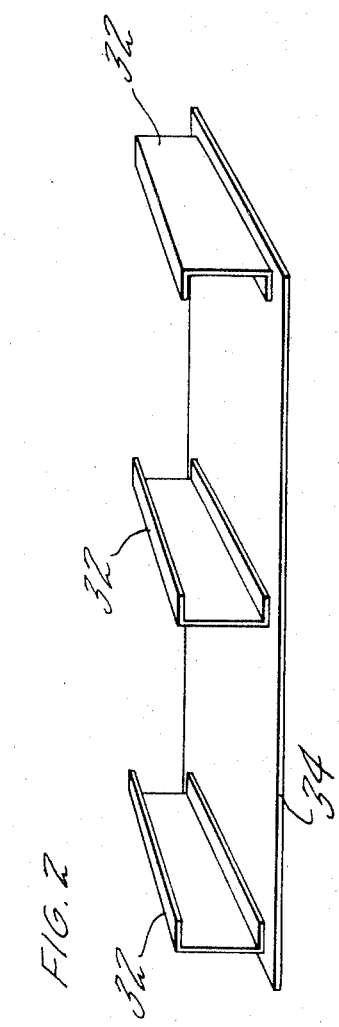
FIG. 2 is a view in perspective showing the duct-like member.

Reference is next made to FIGS. 1 and 2 illustrating the details of this invention wherein the cabin outflow valve is generally illustrated by numeral 10 comprising an inboard gate valve element 12 and an outboard gate valve element 14. Each of the members are hingedly connected to the fixed portion generally illustrated by numeral 16 which may be the structural member defining the skin of the aircraft where ambient is on one side and the cabin air is on the other side. The hinged elements 12 and 14 are substantially rectangularly shaped and extend from the hinges 18 and 20 respectively to the outward end 22 and 24 which may be in overlapping relationship when in the closed position.

In the position as shown in FIG. 1, the gate valve is in a thrust recovery position where the cabin air passes between the inboard gate 12 and the outboard gate 14. The underface 28 of inboard gate 12 is contoured inwardly to define a recess to accommodate the duct-like element 30 suitably secured to the underneath side thereof. Thus, when the inboard gate 12 is in sealing arrangement with the outboard gate 14, that is, in the closed position, the duct 30 will not extend into the slipstream. The duct may be supported by suitable U-shaped support elements 32 mounted at the extremities. Additional support elements may be added depending on the structural needs of the particular design. In the event that more than one intermediate support is used, preferably they should be unequally spaced to avoid the possiblity of supported harmonics from one section to the other. Obviously the structural support elements could take any shape and is not considered a part of this invention and it is contemplated that they may be formed integral with the duct. The U-shaped members are suitably attached to plate-like element 34 which when mounted to the underneath surface of the inboard gate, defines therewith an open ended channel or duct. The support elements are slightly tapered from the inner extremity to the outer extremity so that when in the mounted position the height of the inlet portion is shorter than the height of the discharge portion thereof. In this manner the air passing therethrough tends to expand in a controlled fashion to reduce noise levels in the expanding air and to control the thrust recovery aspects of the nozzle exit.

It will be apparent from the foregoing that the air passing through duct 30 will be at a substantially high velocity which reduces the pressure on the underside of inboard gate element 12. Without the duct this condition would require a higher torque since the pressure difference across the member would be the differential between cabin air acting on one side and the reduced pressure acting on the other. However, by virtue of the duct, the pressure acting on the inner surface (inside the duct) of element 34 also sees the reduced pressure occasioned by the high discharge velocity and produces a force that is equal and opposite to the force acting on the underside of inboard gate element 12, thus cancelling the effect of the high velocity air. Thus, the effective force acting on valve element 12 is the pressure difference between cabin air and ambient air, and since this is a lower effective differential pressure the closing torque will be reduced. Air which passes between the plate leading edge and outboard gate is small so that no special sealing provisions are necessary, although preferably this gap should be held to a minimum.

As schematically illustrated, the valve is opened and closed by virtue of a suitable actuator 36 which is connected to link 38 which is, in turn, pivotally connected to the arms 40 and 42. The actuator by virtue of the link serves to move the inboard gate inwardly into the cabin and simultaneously move the outboard gate into the slipstream when in the full opened position. As is well known in the art, any suitable actuating mechanism can be employed without departing from the scope of this invention. For a more detailed description thereof, reference should be made to U.S. Pat. Nos. 3,387,804 and 3,426,984, supra which are herein incorporated by reference. It is also to be understood that the cabin outflow valves are controlled by a suitable cabin pressure controller which serves to provide the signals to the actuator to maintain the pressure in the cabin at predetermined levels.

As actual tests have indicated, the duct element not only serves to reduce the noise level and tones but also tends to reduce the actuating torque. These tests have shown that by virtue of this invention the required actuating torque has been reduced up to 40 percent.

It should be understood that the invention is not limited to the particular embodiments shown and described herein, but that various changes and modifications may be made without departing from the spirit or scope of this novel concept as defined by the follow claims.

I claim:

1. An outflow valve for an aircraft cabin adapted to maintain the pressure therein at predetermined levels of the type having a pair of hinged valve elements supported adjacent the cabin of the aircraft and movable in opposite directions relative to each other and defining a thrust recovery nozzle in a given position, one of said pair of valve elements movable into the cabin and the other of said pair of valve elements movable into the aircraft slipstream, the improvement comprising a duct-like member supported on at least one face of one of said valve elements and being disposed in the discharged air flow stream for conducting at least a portion of the air discharging between said pair of valve elements for suppressing the noise and tone levels propagated by said air and reducing the force level acting on said valve elements.

2. An outflow valve for an aircraft cabin adapted to maintain the pressure therein at predetermined levels of the type having a pair of hinged valve elements supported adjacent the cabin of the aircraft and movable in opposite directions relative to each other and defining a thrust recovery nozzle in a given position, one of said pair of valve elements movable into the cabin and the other of said pair of valve elements movable into the aircraft slipstream, the improvement comprising a duct-like member attached to the underside of the said valve element movable into the cabin for conducting at least a portion of the air discharging between said pair of valve elements for suppressing the noise and tone levels propagated by said air and reducing the force level acting on said valve elements.

3. An outflow valve as claimed in claim 2 wherein said valve element being recessed in order to accommodate said duct-like member so that it doesn't project into the slipstream when said pair of valve elements are in the closed position.

4. An outflow valve as claimed in claim 3 wherein the cross-sectional area of said duct increases from the inlet to the outlet thereof.

5. An outflow valve for an aircraft cabin comprising an inboard and outboard valve element contoured to substantially conform to the shape of the skin of the aircraft and hingedly supported adjacent the skin to open and close an opening formed therein, said inboard and outboard valve elements movable relative to each other in opposite directions so that the inboard valve element moves toward the cabin and the outboard valve element moves away from the cabin, the inboard and outboard valve elements cooperating with each other for defining a thrust recovery nozzle when in a partially opened position, a plate-like element spaced from the outer face of said inboard valve element and terminating in proximity with the outboard valve element, side supports adjacent opposite edges of said plate-like element supporting said plate-like element to the inboard valve element, and defining therewith an open ended channel for receiving the discharge air passing between said inboard and outboard valve elements when in said thrust recovery position.

* * * * *